INVENTOR.
BAYNARD R. SMITH

United States Patent Office 2,770,669
Patented Nov. 13, 1956

2,770,669

MULTIPLE SOLDER-SEAL BUSHING

Baynard R. Smith, Matawan, N. J., assignor to Steatite Research Corporation, Keasbey, N. J., a corporation of Delaware Application January 26, 1953, Serial No. 333,323

5 Claims. (Cl. 174—152)

This invention relates to insulating bushings which are adapted to be soldered to metallic containers such as transformer boxes to provide an insulated electrical lead from one side of a metallic wall to the other.

Among the objects of the invention is to provide an insulating bushing which when soldered to a wall provides two or more separate seals between the bushing and the wall.

One of the main causes of rejects in the sealing of bushings to transformer containers is that a leak develops at the soldered joint. According to the prior art only one continuous soldered joint is formed between the bushing and the transformer container. If this solder of such joint loses its cohesion at only one point on the surface of a joint there is a tendency for the separation of the solder to develop all the way through the joint and thereby cause the joint to leak.

One phase of this invention is based on the discovery that if the soldering surface of a bushing is separated into a plurality of zones, each being continuous in itself, there is considerably less tendency for leaks to develop in a soldired joint since a discontinuity which may develop in one such zone does not spread to a zone from which it is separated. This effect is noted even though the total area of the separate zones is less than the area of the single soldering zone formed according to the prior art. Two such separate zones work very well although with larger soldering areas the number of zones may be increased. A very satisfactory way of separating the soldering area into two or more zones is to provide one or more continuous grooves in said area.

Another phase of the invention is based on the discovery that such bushings with one or more continuous grooves therein to provide separated soldering areas provide better soldered seals. This is believed to be due to the fact that said grooves provide a space for excess solder to flow and also that the air or flux trapped in said groove expands and escapes therefrom on heating and that thereafter a vacuum develops in the groove to draw solder towards the sealing areas on cooling.

Another phase of the invention is based on the discovery that the grooves in the sealing area provide a means to hold solder in the proper place to provide a bushing-solder assembly that requires no additional solder for sealing to a metallic wall.

The foregoing and other objects of the invention will be best understood from the following description of exemplifications of the same when read in connection with the accompanying drawing in which Fig. 1 is a cross sectional view of one form of bushing made according to the present invention.

Figure 1:
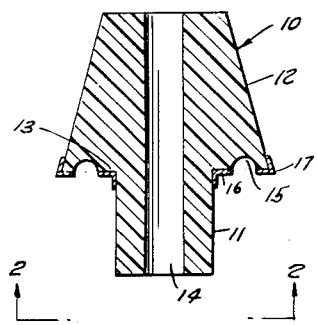

The bodies of the bushings of the invention are formed of any desired insulating material capable of withstanding soldering temperatures, such as steatite, porcelain, etc. The exact shape of the insulating body is not important except that each should include a shoulder portion running all the way around the same to provide an area of surface contact with the wall to which the bushing is to be sealed. In Fig. 1, for example, the bushing 10 has a cylindrical lower portion 11, a frusto conical upper portion 12 connected by the shoulder 13. An axial opening 14 extends through the bushing for the insertion of the lead.

The shoulder 13 includes an annular groove 15 and solderable layers of metal 16 and 17 such as silver are deposited on both sides of said groove 15.

Figure 3:
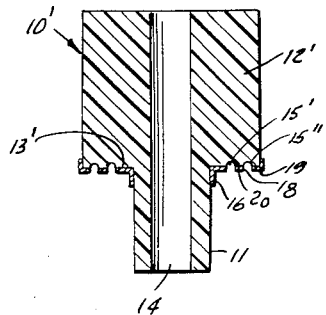
Fig. 3 is a cross sectional view of a modified form of bushing.
Figure 2:
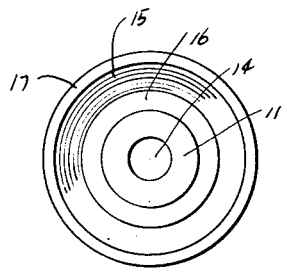
Fig. 2 is a bottom view of the bushing of Fig. 1.

As many grooves may be provided on the shoulder 13 as desired but the grooves are preferably separated by a flat area to provide an additional silvered zone capable of sealing onto a transformer wall for example. In Fig. 3 two grooves 15' and 15" are shown separated by a land portion 20 so that the shoulder 13' contains three separate silvered areas 16, 18 and 19.

The bushings shown are circular in cross section but it is obvious that they could also be square or polygonal in cross sectional shape. The top portion 12' of Figs. 3 and 4 is cylindrical instead of frusto conical as in Fig. 1.

Figure 4:
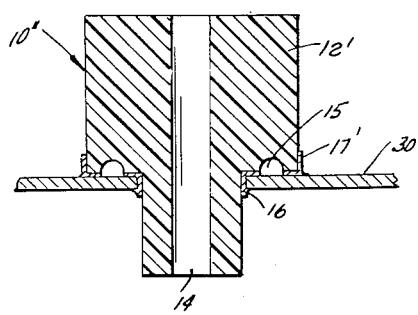
Fig. 4 is a cross sectional view of another modified form of bushing showing how the bushing is attached to a metal wall.

Fig. 4 shows the bushing 10" as it appears in cross section when soldered to a wall 30. It will be seen that instead of one continuous seal extending all the way across the shoulder, two separated sealed areas at the silvered areas 16 and 17 are provided. If a break away should start in one of these areas 16 or 17, it cannot spread to the other area as the spread is stopped at the groove 15. With a bushing like that shown in Fig. 3 three separated sealing areas are provided.

As indicated heretofore, the superior seal obtained appears also to be due to the vacuum formed in the groove 15 during the soldering process. When the bushing 10 and wall 30 are heated in the soldering process part of the air in the groove 15 is forced out of the space between the wall 30 and said groove. On subsequent cooling of the assembly the vacuum formed within this same space holds the wall 30 and bushing 10" tightly together to prevent separation of the parts during cooling.

Figure 5:
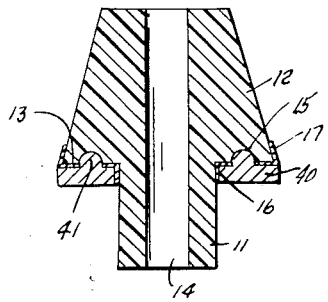
Fig. 5 is a cross sectional view of the bushing of Fig. 1 with an attached strip of solder.

Another advantage of the groove form of shoulder 13 is that the groove 15, 15' or 15" forms an attaching means for a ring of solder 40. As shown in Fig. 5, the ring 40 may be prepared with a projection 41 thereon to fit into the groove 15. The resultant assembly is then easily soldered onto a wall such as the wall 30 of Fig. 4 since the required solder is evenly spread on the surface to be soldered and no additional solder is required.

It will be readily seen that the invention provides a double, triple or multiple seal where only a single seal has been provided heretofore and that the multiple seal greatly decreases the chances that leakage will occur at the boundary surfaces of the bushing and the wall to which it is attached.

The features and principles underlying the invention described above in connection with specific exemplifications will suggest to those skilled in the art many other modifications thereof. It is accordingly desired that the appended claims shall not be limited to any specific feature or details shown or described in connection with the exemplifications thereof.

I claim:

1. In a sealable bushing comprising a unitary body of insulating material having a lower portion of substantially uniform cross sectional shape along the length thereof and an enlarged top portion connected by a shouldered area, the improved construction comprising at least one endless groove extending within said shouldered area, flat areas on each side of said groove, and a metallic coating on each of said flat areas.

2. The bushing as set forth in claim 1 in which said shouldered area contains only one of said endless grooves.

3. The bushing as set forth in claim 1 in which said shouldered area contains at least two of said endless grooves.

4. A sealable bushing comprising a unitary body of insulating material having a lower portion of substantially uniform cross sectional shape along the length thereof and enlarged top portion connected by a shouldered area, said shouldered area comprising at least one endless groove extending within said shouldered area with flat areas on each side thereof and a metallic coating on each of said flat areas, in combination with a solder ring of approximately the shape of said shouldered area and having a projecting portion adapted to fit in and be held by a groove of said shouldered area.

5. A sealed terminal structure comprising a metal wall having an opening therein and an insulating bushing having a unitary body of insulating material, said body of the insulating bushing having a lower portion adapted to snugly fit into said opening in said wall, and an enlarged upper portion, a shoulder at the area where the lower portion and the upper portion of said body are joined together, said shouldered area comprising at least one endless groove extending about the same with flat surfaces on each side thereof and a solder seal between each of said flat areas and the contacting area of said wall.

References Cited in the file of this patent

UNITED STATES PATENTS

| | | |
|---|---|---|
| 1,562,533 | Weintraub | Nov. 24, 1925 |
| 1,776,502 | Gresley et al. | Sept. 23, 1930 |
| 2,274,954 | Dykstra et al. | Mar. 3, 1942 |
| 2,431,474 | Gaudenzi et al. | Nov. 25, 1947 |
| 2,440,298 | Ronay et al. | Apr. 27, 1948 |
| 2,448,907 | Ost | Sept. 7, 1948 |